United States Patent
Kotecha

(10) Patent No.: US 8,355,714 B2
(45) Date of Patent: Jan. 15, 2013

(54) ROUTE OPTIMIZATION USING NETWORK ENFORCED, MOBILE IMPLEMENTED POLICY

(75) Inventor: Lalit Ratilal Kotecha, Union City, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/397,464

(22) Filed: Feb. 15, 2012

(65) Prior Publication Data

US 2012/0147874 A1 Jun. 14, 2012

Related U.S. Application Data

(63) Continuation of application No. 12/068,393, filed on Feb. 6, 2008, now Pat. No. 8,208,919.

(51) Int. Cl.
*H04W 4/00* (2009.01)

(52) U.S. Cl. .................. 455/433; 455/432.1; 455/432.2; 455/432.3; 455/445; 455/452.2; 455/41.2; 455/513; 370/238; 370/238.1; 370/312; 370/389; 370/392; 370/395.31

(58) Field of Classification Search .................. 370/238, 370/238.1, 312, 349, 389, 392, 395.31; 455/432.1–433, 445, 452.2, 41.2, 513
See application file for complete search history.

(56) References Cited

U.S. PATENT DOCUMENTS

| | | | |
|---|---|---|---|
| 6,615,041 B2 | 9/2003 | Adamany et al. | |
| 6,735,429 B1 | 5/2004 | Adamany et al. | |
| 7,230,951 B2 * | 6/2007 | Mizell et al. .................. 370/401 |
| 2003/0120594 A1 | 6/2003 | Shaginaw et al. | |
| 2003/0214958 A1 | 11/2003 | Madour et al. | |
| 2004/0100951 A1 * | 5/2004 | O'neill .......................... 370/389 |
| 2004/0133682 A1 * | 7/2004 | De Vriendt et al. ........... 709/226 |
| 2004/0148343 A1 | 7/2004 | Mottes | |
| 2004/0162058 A1 | 8/2004 | Mottes | |
| 2004/0208153 A1 | 10/2004 | Mizell et al. | |
| 2004/0210524 A1 | 10/2004 | Benenati et al. | |
| 2005/0047378 A1 | 3/2005 | Wuschke et al. | |
| 2005/0111454 A1 * | 5/2005 | Narjala et al. ................. 370/392 |
| 2005/0215250 A1 | 9/2005 | Chava et al. | |
| 2007/0091822 A1 | 4/2007 | Do et al. | |
| 2007/0297378 A1 * | 12/2007 | Poyhonen et al. ............. 370/338 |

FOREIGN PATENT DOCUMENTS

WO WO-2007/109955 10/2007

OTHER PUBLICATIONS

Entire Prosecution of U.S. Appl. No. 12/068,393 to Lalit Ratilal Kotecha on Feb. 6, 2008, entitled, "Route Optimization Using Network Enforced, Mobile Implemented Policy."

(Continued)

*Primary Examiner* — Jinsong Hu
*Assistant Examiner* — Michael Nguyen

(57) ABSTRACT

Route optimization is based on a network enforced, and mobile implemented, policy. A communication session between a mobile device and an access router is established. First and second IP addresses to be assigned to the mobile device are received by the mobile device via the established communication session, as is a set of rules. The mobile device evaluates at least one parameter of the communication session against the set of rules to determine which of the IP addresses to use to communicate with an external device, and proceeds to communicate with the external device using the selected IP address based upon the evaluation result.

13 Claims, 8 Drawing Sheets

OTHER PUBLICATIONS

International Search Report and Written Opinion of the International Searching Authority issued in International Patent Application No. PCT/US 09/33424 dated Apr. 7, 2009.

"Draft Report of the SMG6 GPRS Charging Working Party" Meeting #25, Hosted by T-Mobil in Bonn, Germay, Jun. 15, 1999, 4 pages.

"Inter-PLMN Backbone Guidelines" GSM Association Permanent Reference, Document: IR.34 Version 3.0.1, Sep. 5, 2000, 30 pages.

"GPRS Roaming Guidelines" GSM Association Permanent References Document :IR.33, Version 3.2.0, Apr. 3, 2003, 21 pages.

"cdma2000 Wireless IP Network Standard: Accounting Services and 3GPP2 Radius VSAs" 3rd Generation Partnership Project 2 "3GPP2", Version 1.0.0, Aug. 2003, 48 pages.

Calhoun P: "Mobile IP Network Access Identifier Extension for IPv4; RFC 2794", Internet Engineering Task Force (IETF), Mar. 2000, XP015008577.

Nortel et al: "Alternative solution for Local Breakout for IMS", 3RD Generation Partnership Project (3GPP) Draft S2-080996, Jan. 22, 2008, XP050263402, [retrieved on Jan. 22, 2008].

\* cited by examiner

BACKGROUND

BACKGROUND

ROUTE OPTIMIZATION USING NETWORK ENFORCED, MOBILE IMPLEMENTED POLICY

RELATED APPLICATION

This application is a Continuation of application Ser. No. 12/068,393 filed on Feb. 6, 2008, the entire contents of which are incorporated herein by reference.

BACKGROUND

A modern wireless communication network combines a radio access network ("RAN") with an Internet Protocol ("IP") network. The RAN is configured to provide a mobile device with a wireless connectivity over an air-link network, and the IP network is configured to provide the mobile device with IP connectivity and services. FIG. 1 illustrates an exemplary wireless communication network 100 used by a mobile device to access IP services. The wireless communication network 100 may include a third generation or a fourth generation wireless network.

In either case, wireless communication network 100 includes a mobile device 110 configured to access IP services through a home network 120 and an IP network 130. In one implementation, mobile device 110 includes software that enables mobile device 110 to act as a mobile phone. To this end, mobile device 110 is configured to receive as an input a telephone number associated with a call recipient and in response send, over home network 120 and IP network 130, a request to connect to a mobile device associated with the entered telephone number.

The mobile device 110 may be, for example, a wireless telephone, a personal digital assistant ("PDA"), a messaging device (e.g., a pager), a text messaging or a portable e-mail device (e.g., a Blackberry® or a Sidekick®), a portable music player (e.g., an iPod®) or some other electronic portable messaging, entertainment, organization, or gaming device. Regardless of the particular type of mobile device 110, mobile device 110 includes an interface for receiving, from the user, an input such as, for example, a number associated with another mobile device.

The home network 120 includes a radio access technology that enables mobile device 110 to access IP network 130. In particular, home network 120 includes base stations 122, a home access router (H-AR) 124, and a home agent (HA) 126. The base stations 122 may serve as a hub for radio communications over home network 120 and may support sub-layers of an air-link protocol carried for transmitting and/or receiving data packets to and/or from mobile device 110. The base stations 122 could be using one of several mobile access technologies for allowing mobile device 110 to connect to home access router 124. For example, base stations 122 may be using access technologies such as global system for mobile communications ("GSM"), general packet radio service ("GPRS"), code division multiple access ("CDMA"), ultra mobile broadband ("UMB"), long term evolution ("LTE"), and/or WiMax. The base stations 122, however, are not limited to these technologies.

Regardless of the type of technology used by base stations 122, base stations 122 are configured to allow mobile device 110 to connect to home access router 124. The home access router 124 terminates an interface of mobile device 110 toward home network 120. To this end, home access router 124 performs packet routing and forwarding, provides lawful interception of traffic, and relays traffic between base stations 122 and home agent 126.

The home agent 126 is configured to support an interface to IP network 130. In particular and in one implementation, home agent 126 is configured to allocate an IP address to mobile device 110, provide IP access policy enforcement, perform lawful interception of IP traffic, support billing and charging for IP services, and provide per-user based packet filtering.

The home network 120 also includes a home management entity 128. The home management entity 128 is configured to perform a management function such as authentication, keeping track of a current location of mobile device 110, paging and roaming. The home management entity 128 is also configured to assign IP addresses and provide policy information regarding network communication to mobile device 110.

The wireless communication network 100 supports mobile communications in a limited area based on the coverage area of home network 120. That is, depending on the location of mobile device 110, wireless communication network 100 may not be able to support all calls associated with mobile device 110. When mobile device 110 roams outside the coverage area of home network 120, its signals may be picked up by base stations associated with a visited network (e.g., a roaming network). This scenario is illustrated in more detail with respect to FIG. 2.

FIG. 2 illustrates an exemplary wireless communication network 200 in which a mobile device has roamed outside the coverage area its home network and into a coverage area of a visited network. The wireless communication network 200 includes mobile devices 210, 212, a home network 220, an IP network 230, and a visited network 240. The mobile device 210, home network 220, and IP network 230 are generally similar to mobile device 110, home network 120, and IP network 130 and therefore are not described in more detail.

The visited network 240 includes features similar to home network 220. In particular, visited network 240 includes base stations 242, a roaming access router (R-AR) 244, and a roaming home agent (R-HA) 246. The base stations 242, roaming access router 244, and roaming home agent 246 are generally similar to base stations 122, home access router 124, and home agent 126. Accordingly, these items are not described in more detail.

The wireless communication network 200 illustrates a scenario in which a user of mobile device 210 roams outside its home network 220 (e.g., San Francisco, Calif.) into a visited network 240 (e.g., Washington D.C.), and the user of mobile device 210 makes a telephone call, for example, to another user operating mobile device 212 inside Washington D.C. As shown, the traffic associated with the telephone call goes away from Washington D.C. to San Francisco, Calif. via communication session 250 and comes back to Washington D.C. via the same communication session. The policies hosted by the roaming access router dictates the destination of the traffic. According to a standard policy, roaming access router 244 is configured to send traffic associated with mobile device 212 to San Francisco. To illustrate further, in one example, as a part of authenticating the mobile device 212 and the establishing communication session 250, roaming access router 244 receives a list of source addresses that should be routed to San Francisco. Among the source addresses is the source address employed by mobile device 212. Therefore, when roaming access router 244 receives the traffic having a source address employed by mobile device 212, roaming access router 244 forwards this traffic to San Francisco through communication session 250. The traffic then comes back from San Francisco to Washington D.C. through the same communication session.

As one can imagine, in some implementations, sending the traffic from Washington D.C. to San Francisco. Calif. and back to Washington D.C. may not provide for a minimized latency and the best route optimization. Additionally, sending the traffic in this manner may not provide for optimum traffic quality because the greater communication path results in a greater degradation of voice quality.

Accordingly, one of the features not defined in the prior art is how to optimize traffic routing when a mobile device roams outside its home network. Therefore, there is a need for a route optimization method that enables a mobile device to selectively route traffic within a visited network without having to send the traffic to the home network. This is needed to insure a desired quality of service.

The details of one or more implementations are set forth in the accompanying drawings and the description below. Other features will be apparent from the description and drawings, and from the claims. Implementations of the described techniques may include hardware, a method or process, or computer software on a computer-accessible medium.

DETAILED DESCRIPTION

In the following detailed description, numerous specific details are set forth by way of examples in order to provide a thorough understanding of the relevant teachings. However, present teachings may be practiced without such details. In other instances, well-known methods, procedures, components, and circuitry have been described at a relatively high-level, without detail, in order to avoid unnecessarily obscuring aspects of the present teachings.

In accordance with techniques described herein, a mobile device is enabled to optimize IP packet routing when the mobile device roams outside its home network. To achieve this, the mobile device receives two assigned IP addresses for its use in communications with external devices. The first IP address includes a home IP address configured to be used for traffic requiring services of the home network. The second IP address includes a roaming IP address configured to be used for route optimization when the mobile device roams outside its home network. The route optimization includes enabling the mobile device to communicate with the external devices via the visited network and without the help of the home network. This concept may also be called local traffic breakout, where high priority traffic is treated differently by mobile device and network nodes.

To further illustrate, in one specific example when a mobile device is located in a visited network (e.g., roaming network), the mobile device establishes a communication session with a roaming access router and receives through the roaming access router the first and second IP addresses. The mobile device also receives a set of rules. The set of rules may be associated with route optimization and may include, for example, rules directing the mobile device to use the roaming IP address for outgoing traffic associated with applications having high priority. Alternatively or additionally, the set of rules may include rules directing the mobile device to use the roaming IP address for outgoing traffic requiring a specific type of quality of service treatment.

In either case, the mobile device evaluates at least one parameter of the established communication session against the set of rules to determine whether to communicate with an external device using the first IP address or the second IP address. And, based on the result of the evaluation, the mobile device communicates with the external device using either the first IP address or the second IP address, as the address of the mobile device itself.

Figure 1:
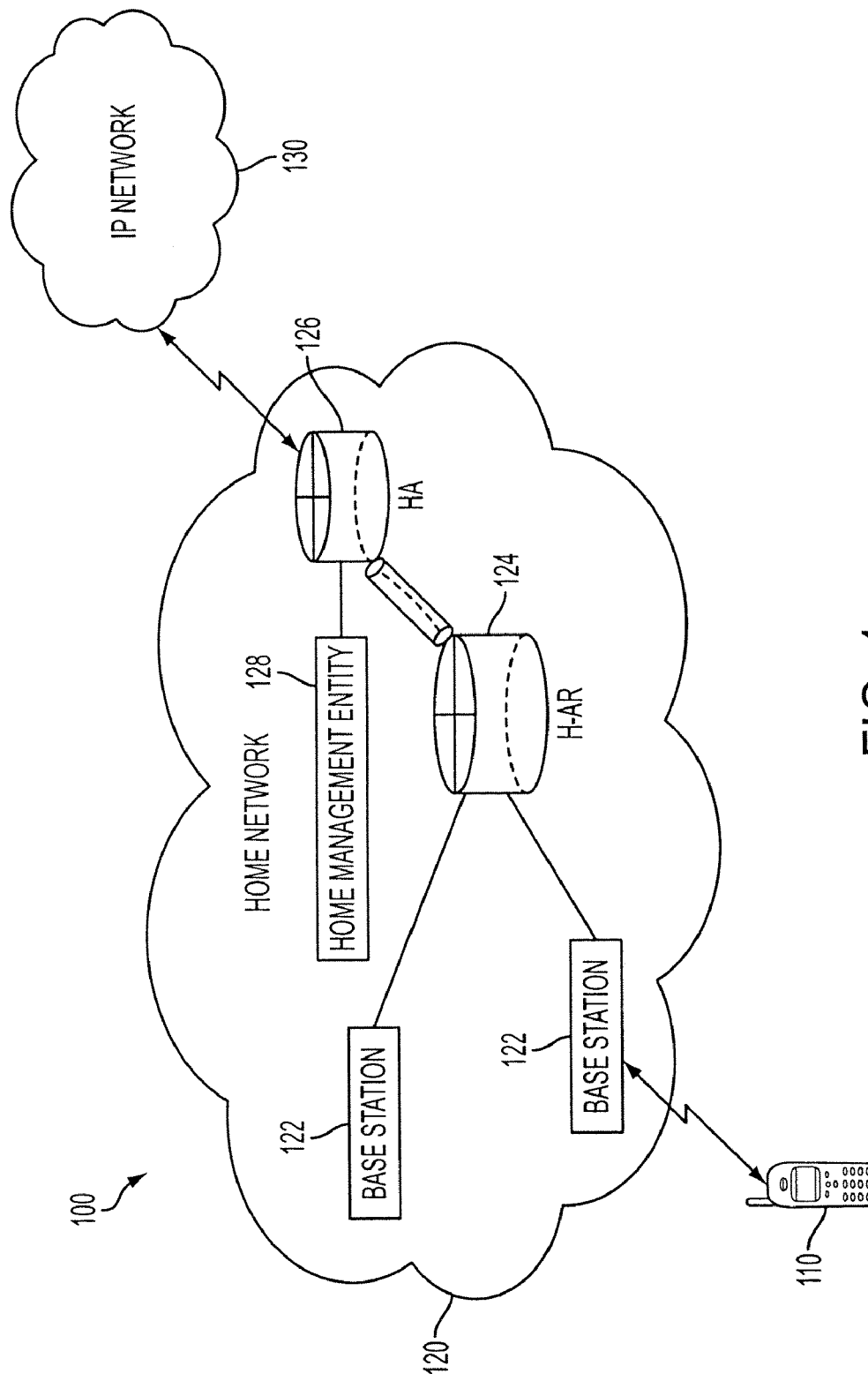
FIG. 1 illustrates an exemplary wireless communication network used by a mobile device to access IP services.
Figure 2:
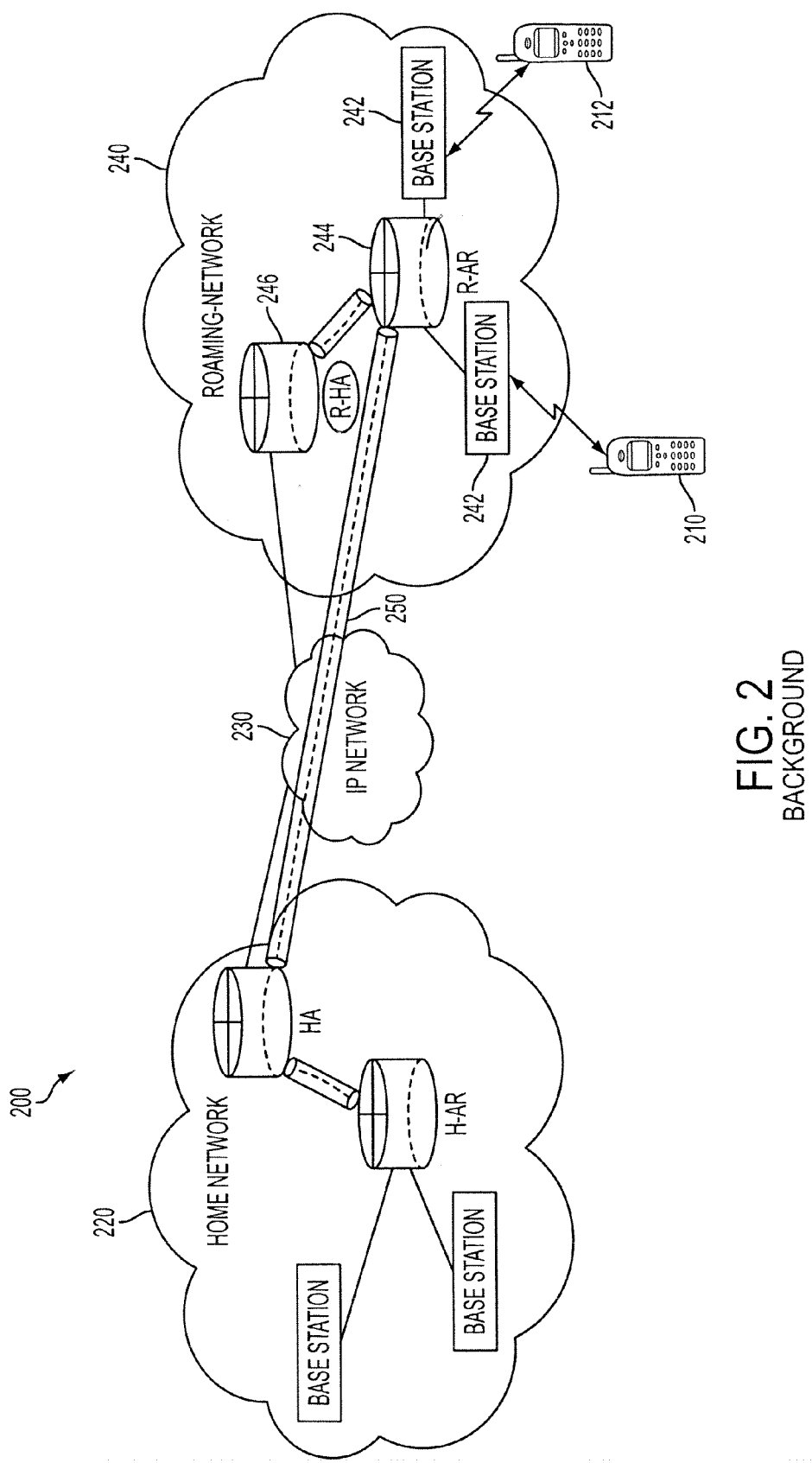
FIG. 2 illustrates an exemplary wireless communication network in which a mobile device has roamed outside the coverage area its home network and into a coverage area of a visited network.
Figure 3:
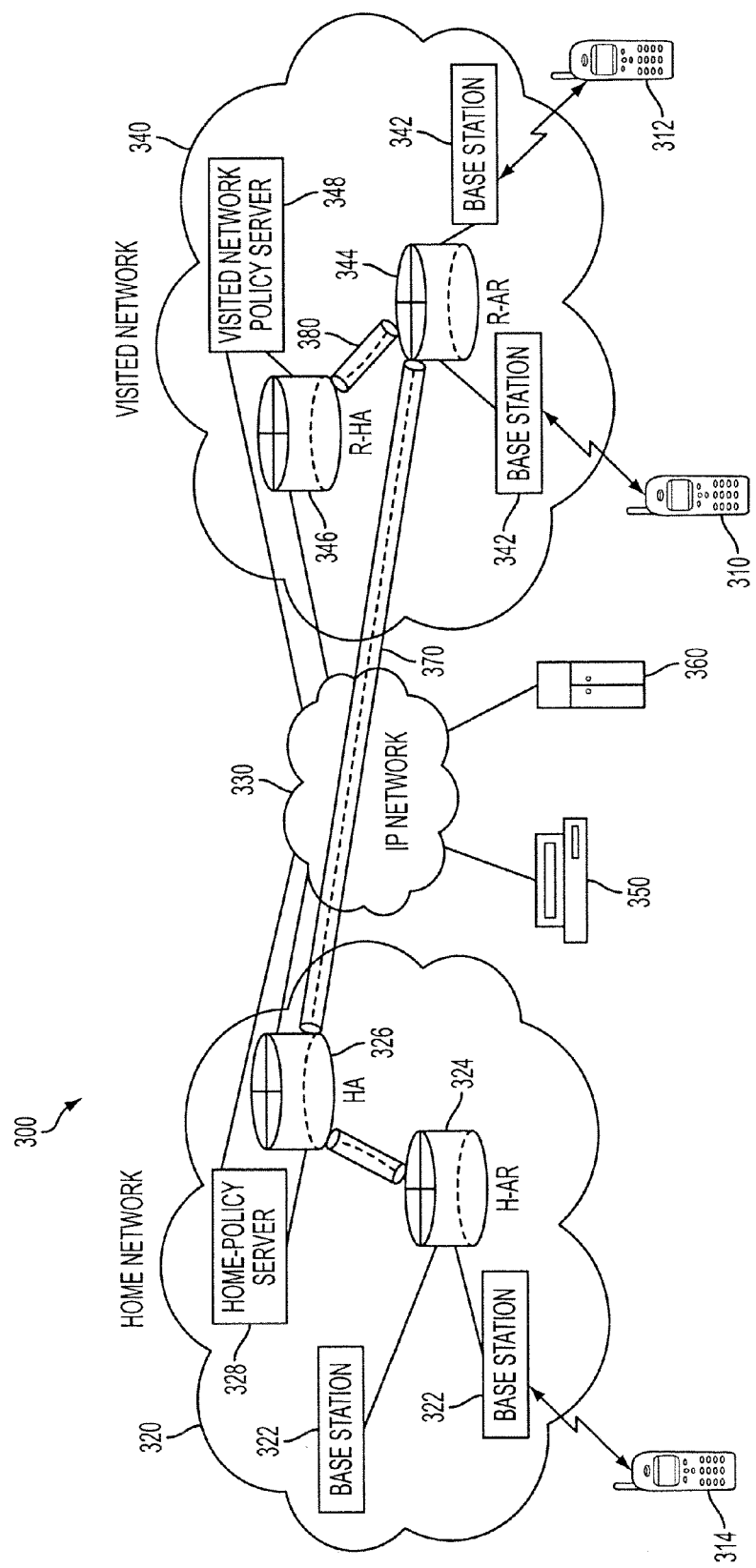
FIG. 3 illustrates an exemplary route optimization architecture within a visited network.

With that overview, it may be helpful to refer to an exemplary figure that illustrates such route optimization architecture. FIG. 3 illustrates an exemplary route optimization architecture 300. The route optimization architecture 300 includes components similar to those described with respect to FIG. 2. However, for the sake of completeness these components are described below in more detail.

The route optimization architecture 300 includes mobile devices 310, 312, 314, communicating with each other via a home network 320, an IP network 330, and a visited network 340. The drawing shows network elements in high-level functional block diagram form. Before describing each element, it may be helpful to describe in high-level the route optimization architecture 300.

At high-level, mobile device 310 "homed" on home network 320 roams outside the support area of home network 320. Upon entering coverage area of visited network 340, mobile device 310 registers as a visitor with visited network 340. In response to the initial registration request, visited network 340 communicates with home network 320 to determine if mobile device 310 is a valid customer's mobile device of home network 320. Upon determining the same, visited network 340 allows registration which enables subsequent communication through visited network 340.

For purposes of discussion, assume that mobile device 310 wishes to communicate with mobile device 312 "homed" on visited network 340. The communication may include, for example, a Voice over IP ("VoIP") communication. To achieve this, mobile device 310 interacts with visited network 340 to establish a communication session. As noted in the background section, in the prior art, the outgoing traffic from mobile device 310 appears to originate on its home network 320. That is, the outgoing traffic from mobile device 310 goes to home network 320 and from home network 320 goes to mobile device 312. Similarly, the incoming traffic originated from mobile device 312 and directed to mobile device 310 goes to home network 320 and from home network 320 goes to mobile device 312. This may result in an extra communication latency. By contrast, in route optimization architecture 300, mobile device 310 has the option of either routing the outgoing traffic to home network 320 and from home network 320 to mobile device 312 or routing the outgoing traffic directly to mobile device 312 via visited network 340 without sending the traffic back to home network 320 and thereby improving communication latency. Similarly, the incoming traffic originated from mobile device 312 can either be routed to home network 320 and from home network 320 to mobile device 310 or routed directly to mobile device 310 via visited network 340 without sending the traffic back to home network 320 and thereby improving communication latency.

To fully understand the technology, route optimization architecture 300 will be described in more detail. The route optimization architecture 300 may support a variety of multimedia voice and data services, using digital packet communications over the air link. It also may support Voice over IP type telephone communications, as well as high-speed web browsing, just to name two exemplary services. In one implementation, the route optimization architecture 300 defines a fourth generation wireless network for enabling IP communication services for numerous mobile devices, although for discussion purposes, FIG. 3 shows three such devices.

The mobile devices 310, 312, and 314 sometimes referred to as mobile nodes, typically run one or more "client" programs for implementing the agent functionality with respect to one or more communication services that the user obtains or subscribes to through the route optimization architecture 300. The mobile devices 310, 312, and 314, for example, may take the form of a mobile telephone station, with display and user input capabilities to support multimedia communications. Today, such mobile telephones station take the form of portable handsets, although they may be implemented in other forms.

For another example, mobile devices 310, 312, and 314 may take the form of a PDA or a portable personal computer ("PC"), incorporating a wireless transceiver compatible with the particular type of wireless packet data service offered by the route optimization architecture 300. Of course, the mobile devices 310, 312, and 314 may take other forms or connect to a variety of other data devices that may enable use of the network communication services.

The route optimization architecture 300 may comprise access networks operated by a large number of separate and independent service providers or "carriers." For discussion purposes, FIG. 3 shows two such radio access networks, home network 320 and visited network 340, which are operated by two different carriers. Through the carriers' access networks 320 and 340, the overall route optimization architecture 300 offers mobile communications to customers using mobile stations throughout a wide geographic area.

The home network 320 includes base stations 322, a home access router (H-AR) 324, a home agent (HA) 326, and a home policy server 328. The base stations 322 can communicate via an antennae system and an air-link with one or more of mobile devices 310, 312, and 314, when they are within range. In particular, base stations 322 are coupled to one or more antennas (not shown) mounted on a radio tower within a coverage area often referred to as a "cell" and form part of the radio network for sending and receiving radio frequency signals to/from the mobile devices that the base stations 322 currently serve. The base stations 322 are configured to assign and reassign channels to mobile devices 310, 312, and 314 and are further configured to serve and monitor the signal levels for recommending hand-offs to other base stations.

As shown, base station 322 connects mobile device 314 to home access router 324. The home access router 324 may include a number of radio access network switches, which may be able to support both cellular voice and packet data services. The home access router 324 typically includes a base station controller functionality that controls the functions of a number of base stations 322 and helps to manage how calls made by each mobile device are transferred (or "handed-off") from one serving base station to another. The wireless network equipment venders may implement this function differently. Some vendors have a physical entity, which they call a base station controller, while other vendors include this functionality as part of their switch (not shown).

The home access router 324 is coupled to home agent 326. The home agent 326 may act as a packet data serving node. The home agent 326 may be a fixed network element to support packet-switched data services. In one implementation, home agent 326 is configured to establish, maintain, and terminate logical links to the associated portion of home network 320. The home agent 326 may also be configured to support point-to-point ("PPP") sessions with mobile devices 310, 312, and 314.

Additionally, home agent 326 may be configured to support an interface for the mobile devices 310, 312, and 314 to other packet switched networks, represented generally by IP network 330. In particular, home agent 326 may be configured to allocate an IP address to mobile device 314 within its range, provide IP access policy enforcement, perform lawful interception of IP traffic, support billing and charging for IP services, and provide per-user based packet filtering.

The home network 320 also includes home policy server 328. In one implementation, home policy server 328 is configured to perform a management function such as authentication, keeping track of a current location of mobile devices, such as, for example, mobile device 314, paging and roaming. The home policy server 328 may also be configured to assign IP addresses and provide policy information regarding network communication to mobile device 314.

Additionally, home policy server 328 may be configured to store data regarding the valid station's identification, the assigned telephone number, subscription service options terminal capabilities, etc. To this end, home network 320 may use the service information from home policy server 328 to provide the subscribed services to user's mobile device, for example, while mobile device 314 is operating in the service area of home network 320. Although home policy server 328 may reside in a single server as shown, it may also run as an application/database on a separate computer coupled for packet signaling communication via SS7 network or other signaling network (not shown).

Although other networks may utilize different technologies or architectures, for discussion purposes it is assumed that visited network 340 is generally similar to home network 320 but operated by another carrier. The visited network 340 includes base stations 342, roaming access router (R-AR) 344, roaming home agent (R-HA) 346, and a visited network policy server 348, which are similar to base stations 322, home access router 324, home agent 326, and home policy server 328, respectively. Therefore, the physical elements of visited network 340 are not described in detail.

The base stations 342, similar to base stations 322, communicate via an antennae system and an air-link with mobile devices 310, 312, when the mobile devices are within range, as shown. The roaming access router 344, similar to home access router 324, carries the user communications for the mobile devices 310, 312 and is coupled to roaming home agent 346. The roaming home agent 346 performs functions similar to those of home agent 326 in home network 320, both to provide packet switched routing services and to perform the validation and billing related functions. For example, similar to home agent 326, roaming home agent 346 may be configured to allocate an IP address to mobile devices 310, 312 within its range, provide IP access policy enforcement, perform lawful interception of IP traffic, support billing and charging for IP services, and provide per-user based packet filtering.

As shown, roaming home agent 346 provides two communication sessions to mobile devices 310, 312, one to home network 320 ending at home agent 326 and another to visited network ending at roaming home agent 346. The communication session between roaming access router 344 and home agent 326 is shown as a communication session 370, and the communication session between the roaming access router 344 and roaming home agent 346 is shown as a communication session 380, each of which are described with respect to FIG. 4 in more detail.

The visited network policy server 348, similar to home policy server 328, is configured to perform a management function such as authentication, keeping track of a current location of mobile devices 310, 314, paging and roaming. The visited network policy server 348 is also configured to assign IP addresses and provide policy information regarding network communication to mobile device.

As noted above, the route optimization architecture 300 supports a range of packet data services. The packet data communications can support traditional data applications, such as browsing the Internet and email communications to/from remote computers such as personal computer 350 or server 360. The packet data communications through the route optimization architecture 300 also can support VoIP type packet applications. The personal computer 350 and server 360 are intended as general examples of classes of devices that may participate in data communications to/from the users' mobile devices 310, 312, and 314.

Different customers subscribe to service through different providers and are assigned to specific radio access networks (e.g., home network 320 or visited network 340) as their home networks; and the mobile devices and network elements are provisioned accordingly. In keeping with the previous example, assume that mobile devices 310 and 314 belong to customers of home network 320 and mobile device 312 belongs to customers of visited network 340. Therefore, mobile devices 310, 314 are "homed" on home network 320 and mobile device 312 is "homed" on visited network 340.

As shown, mobile devices 312, 314 are operating within the service area of their home access provider networks, visited network 340 and home network 320, respectively. By contrast, mobile device 310 has roamed out of the service area of its home network 320 and into a different geographic area, where the mobile device 310 is receiving wireless services from a different access provider (e.g., visited network 340).

Upon entering visited network 340, mobile device 310 should be validated before being able to communicate with other mobile devices, such as, for example, mobile devices 312 and 314. As a part of validation, mobile device 310 receives a first IP address and a second IP address. The process of validation and obtaining the first and second IP address are further described below with reference to FIG. 4. After obtaining the first and second IP addresses, mobile device 310 may communicate with external devices, such as, for example, mobile devices 312, 314.

The communication with the external devices is either routed through home network 320 or routed directly through visited network 340 depending upon usage of the first or the second IP address as a source IP address for the outgoing traffic. The communication with the external devices is further described below with reference to FIG. 5. Below, first, the process of the process of validation and obtaining the first and second IP addresses is discussed with respect to FIG. 4, and then the process of communication of mobile device 310 with external devices using either the first IP address or the second IP address is discussed with respect to FIG. 5.

Figure 4:
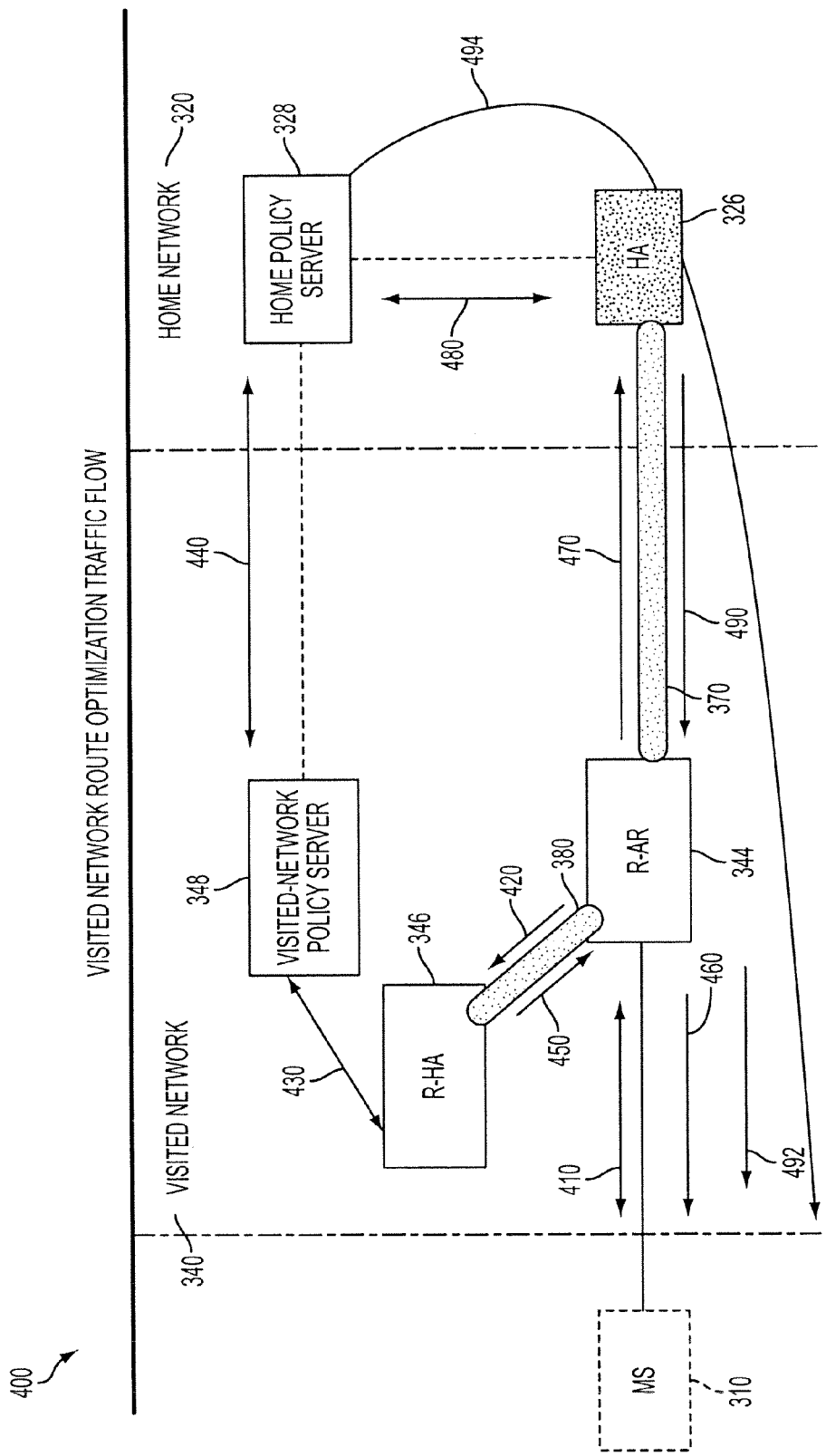
FIG. 4 illustrates an exemplary route optimization traffic flow for validating a mobile device in a visited network and assigning to the mobile device two IP addresses.

FIG. 4 illustrates an exemplary route optimization traffic flow 400 for validating a mobile device in a visited network and assigning to the mobile device two IP addresses. In keeping with the previous examples and for convenience, particular components described with respect to FIG. 3 are referenced as performing the route optimization traffic flow 400. More particularly, route optimization traffic flow 400 involves a mobile device 310, which has roamed outside its home network 320 and into, a visited network 340. The visited network 340 includes a roaming access router (R-AR) 344, a roaming home agent (R-HA) 346, and a visited network policy server 348. The home network 320 includes a home agent (HA) 326 and a home policy server 328.

As a customer roams, mobile device 310 registers in service areas other than the home area. To do so, mobile device 310 establishes a communication session with a roaming access router 344 (step 410). The communication session may include a layer 2 tunnel, which may be used to carry transit traffic between mobile device 310 and roaming access router 344. For example, layer 2 tunnel may utilize Generic Routing Encapsulation ("GRE"), which is a tunneling protocol developed by Cisco Systems to encapsulate network layer packets inside IP tunneling packets. The original packet is the payload for the final packet. Alternatively, the layer 2 tunnel may use IP tunneling, which is a known process of embedding one IP packet inside of another, for the purpose of simulating a physical connection between two remote networks across an intermediate network.

Regardless, as a part of the layer 2 connection setup, mobile device 310 may make a request for an IP address. Alternatively, mobile device 310 may request such IP address using a well-known Dynamic Host Configuration Protocol ("DHCP"). In either case, roaming access router 344 detects that mobile device 310 is roaming and attempts to obtain two IP addresses for mobile device 310. To this end, roaming access router 344 attempts to establish a communication session with a roaming home agent 346 by sending a session binding request message (step 420).

The session may include a network based mobility protocol called Proxy Mobile IP ("PMIP") session. The PMIP is a protocol defined in Internet Draft "Proxy Mobile IPv6 draft-ietf-netlmm-proxymip6-06.txt" submitted on Sep. 23, 2007. The PMIP is based on an external node acting as a Proxy Mobile Node that registers the location of an IP-based communication device and is accessible while the device in on the network.

The roaming home agent 346 receives the request and in response attempts to authorize mobile device 310 to visited network policy server 348 (step 430). The visited network policy server 348 typically resides in MSCs although it may reside in other network nodes. The visited network policy server 348 interacts with home policy server 328 to validate the roaming mobile device 310 (step 440). The home policy server 328 is aware of capabilities and subscribed services of mobile device 310. If home policy server 328 does not allow this communication session, home policy server 328 communicates the same to roaming home agent 346 which, in response, issues a binding reject to roaming access router 344 (step 450).

By contrast, if home policy server 328 validates mobile device 310, roaming home agent 346 sends PMIP binding accept to roaming access router 344 (step 450). As a part of this procedure of binding request and binding accept (steps 420, 450), roaming access router 344 receives, from visited network policy server 348 or roaming home agent 346, an IP address to be assigned to mobile device 310. In turn, roaming access router 344 forwards the IP address to mobile device 310 (step 460).

During successful registration process, IP address service information for mobile device 310 is downloaded from home policy server 328 to visited network policy server 348. The validation process also provides information to home policy server 328 indicating the current location of mobile device 310, in this case, within visited network 340, to allow home network 320 to route incoming voice calls or other traffic to mobile device 310 at its current location.

In one implementation, the IP address is called a roaming IP address and is used for routing high priority traffic from visited network 340. In particular, the roaming IP address is configured to enable mobile device 310 to communicate with the external device through visited network 340. This concept is called local traffic breakout or route optimization, where high priority traffic is treated differently by mobile device 310 and network nodes. To further illustrate and in keeping with the above-described examples, assume that mobile device 310 wishes to communicate with mobile device 312 "homed" at visited network 340. In such a scenario, mobile device 310 may use the roaming IP address as a source IP address and as a result outgoing traffic from mobile device 310 is routed directly by roaming access router 344 to mobile device 312. Subsequently, packets from mobile device 312 use the roaming IP address as the destination address. The roaming IP address points to roaming access router 344, so that the packets reach that router for delivery to mobile device 310, without first going to home network 320. As such, unlike in the prior art, the traffic does not have to go back to home network 320 before being routed to/or from mobile device 312.

Returning back to the visited network route optimization traffic flow 400, in one implementation, after mobile device 310 is provided with roaming IP address, roaming access router 344 triggers a communication session with home agent 326 by sending binding update/registration request message to home agent 326 (step 470). The communication session, in one implementation, is a PMIP session. For an effective PMIP communication between roaming access router 344 and home agent 326 a tunnel may be required. Therefore, if a tunnel has not already been established between roaming access router 344 and home agent 326, a tunnel will be established. To establish a tunnel, roaming access router 344 and home agent 326 may use GRE, IP-in-IP, or GTP based tunneling or equivalent tunneling protocol.

The request may include the credentials of mobile device 310. The credentials may include a subscriber ID and an authentication key. Upon receiving the request, home agent 326 communicates with home policy server 328 to verify the credentials of mobile device 310 (step 480). If the credentials cannot be verified, home agent 326 sends a binding reject with a reject code value to roaming access router 344 (step 490). By contrast, if the credentials are verified, home agent 326 sends binding accept/registration response message to roaming access router 344 (step 490). In one implementation, as a part of binding accept message, home agent 326 or home policy server 328 provides roaming access router 344 with a second IP address to be used by mobile device 310. The roaming access router 344 forwards the second IP address to mobile device 310 for its usage (step 492). In one implementation, the second IP address is called a home IP address and is configured to enable mobile device 310 to communicate with external devices through home network 320.

Moving forward, mobile device 310 communicates with home policy server 328 to receive a policy that specifies how mobile device 310 should use the two IP addresses (step 494).

In one implementation, the policy directs mobile device 310 to use a specific IP address for a specific application. This may allow an application residing at mobile device 310 to send traffic to home network 320 or visited network 340 for route optimization. In another implementation, the policy directs mobile device 310 to use a specific IP address for specific type of quality of service treatment associated with the traffic, independent of an application type. For example, the policy may direct mobile device 310 to use the roaming IP address for outgoing traffic requiring specific type of quality of service treatment.

In yet another implementation, the policy directs mobile device 310 to optimize routing for mobile peer-to-peer applications. In another implementation, the policy directs use of a specific IP address based on the destination of the traffic. For example, if the traffic is destined for an external device (e.g., mobile device 312) also in visited network 340, the policy directs mobile device 310 to use the roaming IP address to avoid sending the traffic to home network 320 and thereby achieving a desired route optimization. Similarly, if the traffic is destined for an external device (e.g., mobile device 314) within a home network 320, the policy directs mobile device 320 to use the home IP address when communicating with the external device. The traffic may include a video traffic or voice traffic.

Regardless of the type of policy implemented by home policy server 328, mobile device 310 is configured to receive the set of rules and evaluate at least one parameter of the communication session against the set of rules for determining whether to communicate with an external device using the roaming IP address or the home IP address. Based on the result of this evaluation, mobile device 310 communicates with the external device using either the roaming IP address or the home IP address. This process is described below in more detail with respect to FIG. 5.

Figure 5:
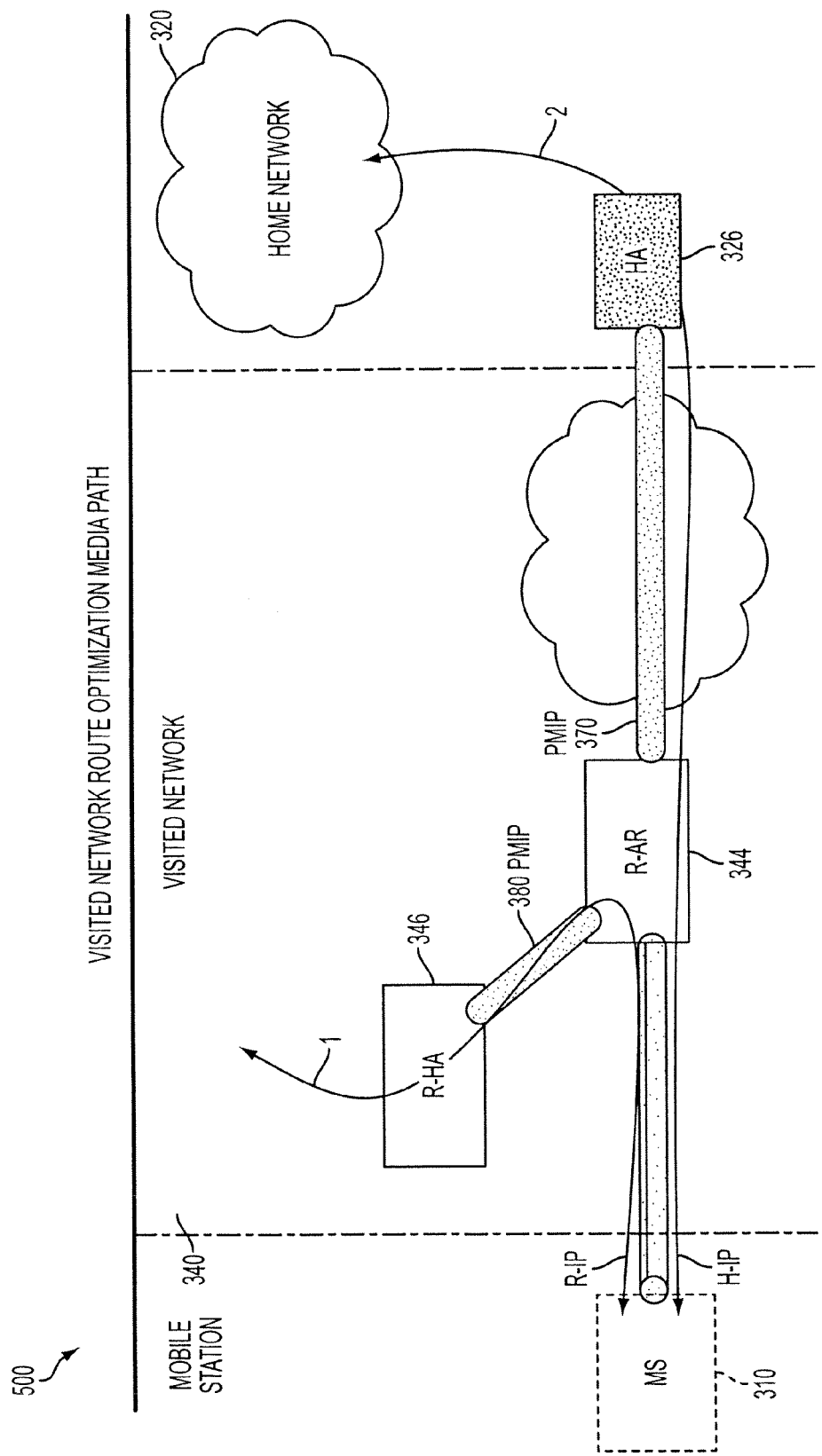
FIG. 5 illustrates an exemplary media path for a visited network route optimization.

FIG. 5 illustrates an exemplary media path 500 for a visited network route optimization. In keeping with the previous examples and for convenience, particular components described with respect to FIG. 3 are referenced as performing visited network route optimization media path 500. More particularly, media path 500 involves a mobile device 310, which has roamed outside its home network 320 into a visited network 340. The visited network 340 includes a roaming access router 344 and a roaming home agent 346. The home network 320 includes a home agent 326.

For the purposes of discussion, it is assumed that the policy includes use of a specific IP address based on a type of application associated with the communication session. In such a scenario, mobile device 310 determines the type of application associated with the communication session and evaluates the type of application against the set of rules. If the application requires high priority treatment, for example, mobile device 310 uses a roaming IP address as a source IP address and forwards the traffic to roaming access router 344. Alternatively, if the application requires home network services or home network control, mobile device 310 uses a home IP address as a source IP address and forwards the traffic to roaming access router 344.

The roaming access router 344 receives the traffic, determines the IP address associated therewith, and based on the IP address either directly routes the traffic or forwards the traffic to home agent 326. To do so, in one implementation, roaming access router 344 references a table having instructions for forwarding the traffic to an appropriate location. For example, the table includes an entry directing roaming access router 344 to directly route the traffic if the traffic includes the roaming IP address (e.g., media path 1). For example, an IP packet originating from mobile device 310 with a roaming IP address as a source IP address will be directly routed by roaming access router 344. Similarly, traffic coming within visited network 340 with the roaming IP address as the destination IP address will be routed to mobile device 310 through roaming access router 344 without going through home agent 326.

The table may also include an entry directing roaming access router 344 to send the traffic to home agent 326 if the traffic includes the home IP address (e.g., media path 2). For example, a mobile device application requiring services of home network 320 will send an IP packet with a home IP address as a source IP address. Such a packet will be sent through PMIP tunnel 370 from roaming access router 344 to home agent 326. The home agent 326 will route the packet to the right destination address. Similar flow applies for traffic in reverse direction. That is, traffic coming within visited network 340 with destination IP address as a home IP address will be routed to home agent 326 and the home agent 326 routes the traffic to mobile device 310.

The traffic may include video or voice traffic. Therefore, by using two IP addresses (e.g., roaming IP address and home IP address), a desired traffic treatment is achieved in a mobile service provider network using PMIP.

Figure 6:
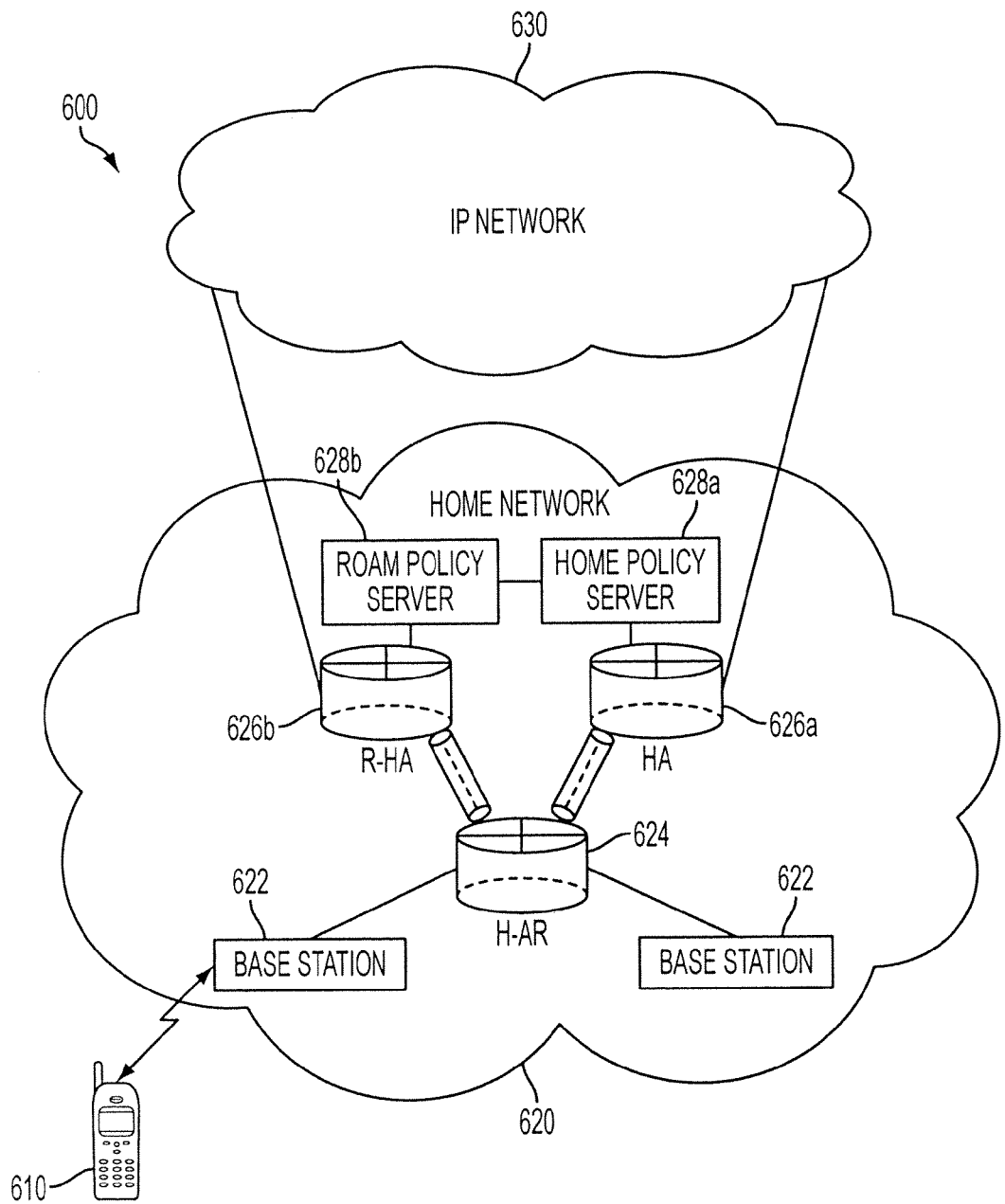
FIG. 6 illustrates an exemplary route optimization within a home network.

Other implementations are contemplated. For example, although the route optimization is described within a visited network in the foregoing implementations, it should be noted that the route optimization may be performed within a home network itself. FIG. 6 illustrates an exemplary route optimization architecture 600 within a home network. The route optimization architecture 600 includes a mobile device 610, a home network 620, and an IP network 630. The mobile device 610 and IP network 630 are generally similar to mobile device 310 and IP network 330 described with respect to FIG. 3 and therefore they are not described in more detail.

The home network 620 includes base stations 622, a home access router 624, home agent 626a, a roaming home agent 626b, a home policy server 628a, and a roaming policy server 628b. To some extend, physical elements of home network 620 is similar to the physical elements of home network 320. In particular, base stations 622, home access router 624, home agent 626a, and home policy server 628a are similar to base stations 322, home access router 324, home agent 326, and home policy server 328, respectively. Therefore, these physical elements are not described in more detail.

The difference is in that home network 620 also includes roaming home agent 626b, and roaming policy server 628b, each of which were previously inside a visited network. That is it is possible for a home network to include both the home agent and the roaming agent, and similarly include both the home policy server and the roaming policy server.

In such an implementation, therefore, home access router 624 determines how to route the traffic based on the IP address associated with the traffic. To do so, in one implementation, home access router 624 references a table having instructions for forwarding the traffic to an appropriate location. For example, the table includes an entry directing home access router 624 to directly route the traffic if the traffic includes the roaming IP address. For example, an IP packet originating from mobile device 610 with a roaming IP address as a source IP address will be directly routed by home access router 624. Similarly, traffic coming within home network 620 with a roaming IP address as the destination IP address will be routed to mobile device 610 through home access router 624 without going through home agent 626a.

The table may also include an entry directing home access router 624 to send the traffic to home agent 626a if the traffic includes the home IP address. For example, a mobile device application requiring services of home network 620 will send an IP packet with a home IP address as a source IP address. Such a packet will be sent through PMIP tunnel from home access router 624 to home agent 626a. The home agent 626a will route the pack to the right destination address. Similar flow applies for traffic in the reverse direction. That is, packets coming within home network 620 with the home IP address as the destination IP address will be routed to home agent 626a and the home agent 626a routes the traffic to mobile device 610.

Figure 7:
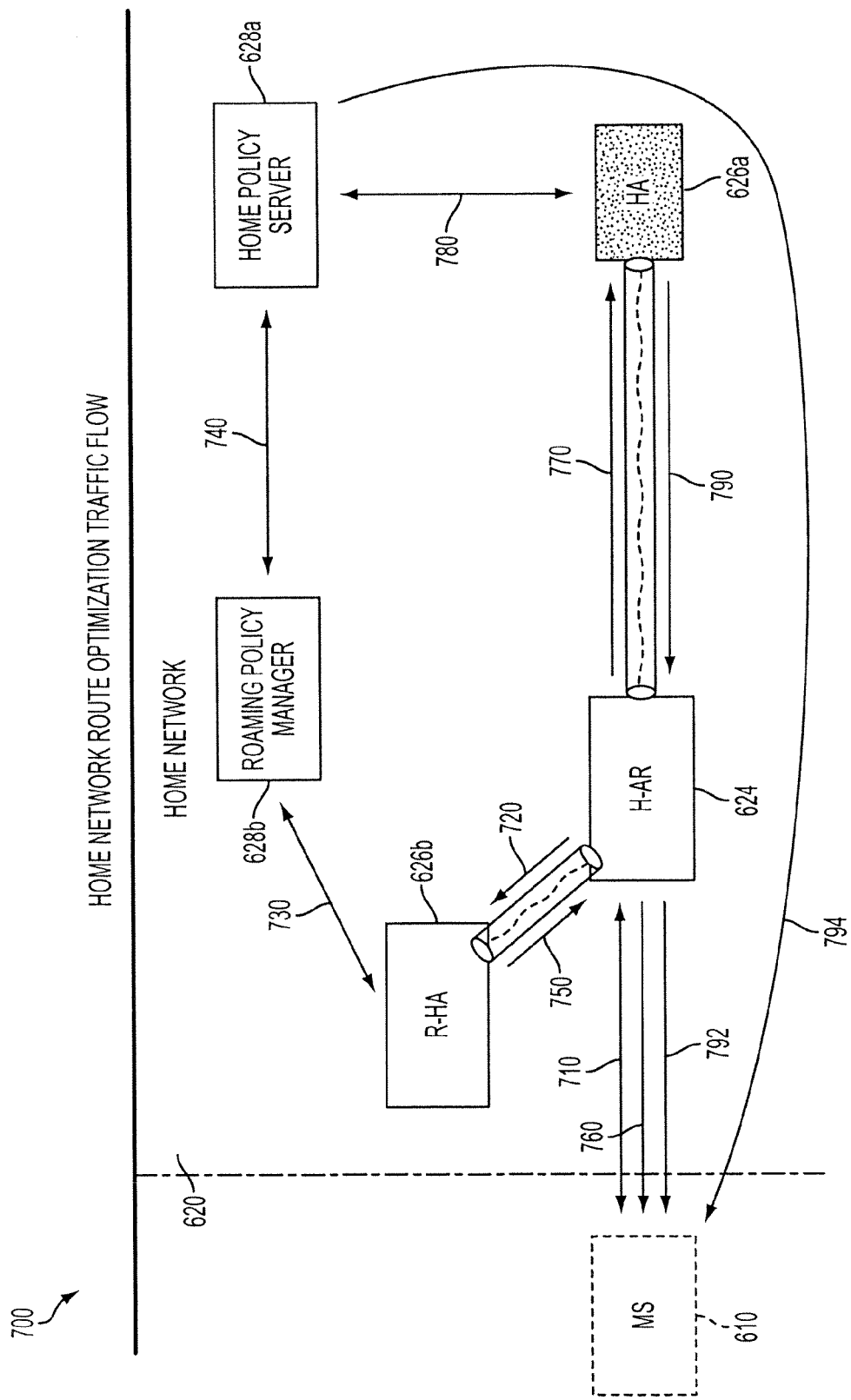
FIG. 7 illustrates an exemplary route optimization traffic flow for validating a mobile device in a home network and assigning to the mobile device two IP addresses.

FIG. 7 illustrates an exemplary route optimization traffic flow 700 for validating a mobile device in a home network and assigning to the mobile device two IP addresses. In keeping with the previous examples and for convenience, particular components described with respect to FIG. 6 are referenced as performing the route optimization traffic flow 700. More particularly, route optimization traffic flow 700 involves a mobile device 610 within its home network 620. The home network 620 includes a home access router 624, a home agent 626a, a roaming home agent 626b, a home policy server 628a, and a roaming home policy server 628b. Other than the fact the roaming home agent 344 is replaced with home agent 624 and the process is carried out within home network 620 instead of within home network 320 and visited network 340, the route optimization traffic flow 700 is similar to the route optimization traffic flow 400. In particular, steps 710-790, 792, and 794 are similar to steps 410-490, 492, and 494. Therefore, the route optimization traffic flow 700 is not described in more detail.

Figure 8:
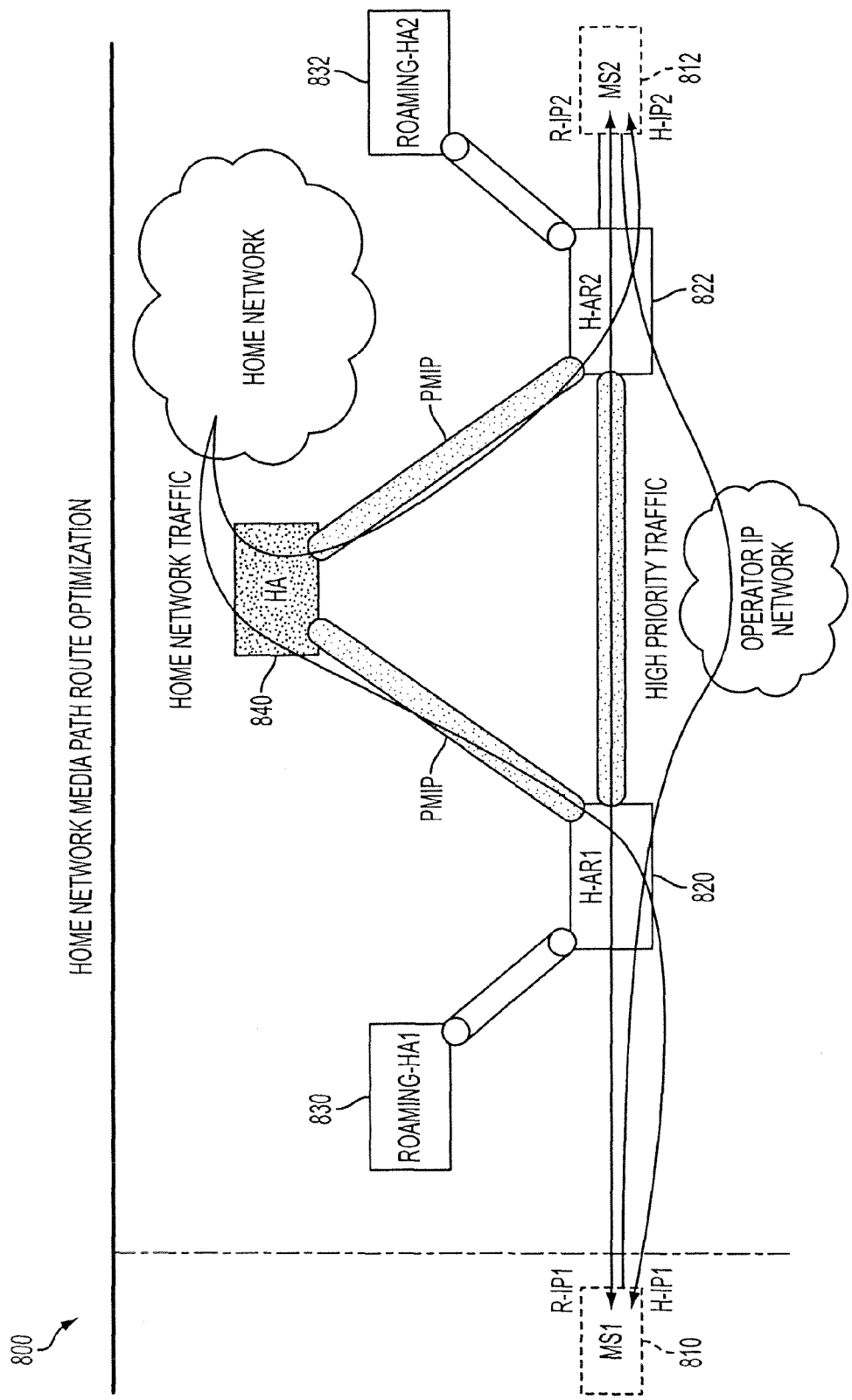
FIG. 8 illustrates an exemplary route optimization media path between two mobile devices served by two different home access routers within the same home network.

In another implementation, route optimization may be achieved between two mobile devices served by two different home access routers within the same home network. FIG. 8 illustrates an exemplary route optimization media path 800 for such a scenario. The media path includes mobile devices 810, 812, home access routers 820, 822, roaming home agents 830, 832, and a home agent 840. Through the procedures described earlier with respect to FIG. 7, mobile device 810 receives a first roaming IP address ("R-IP1") and a first home IP address ("H-IP1") and is connected to home access router 820, roaming home agent 830, and home agent 840. Similarly, mobile device 812 receives a second roaming IP address ("R-IP2") and a second home IP address ("H-IP2") and is connected to home access router 822, roaming home agent 832, and home agent 840.

When mobile device 810 wishes to communicate with mobile device 812 for optimized routing (e.g., higher quality of service and low latency), mobile device 810 will create a packet with R-IP1 as a source IP address and R-IP2 as a destination IP address and sends this packet to home access router 820. The home access router 820 receives the packet and routes the packet directly to home access router 822 without sending the packet to home agent 840. The home access router 820 may send the packet through operator's IP network or a dedicated IP tunnel, depending on network design and configurations.

Alternatively or additionally, when mobile device 810 wishes to communicate with mobile device 812 through home network control (e.g., SIP signaling, Instant Messaging, etc.), mobile device 810 creates an IP packet with H-IP1 as a source IP address and H-IP2 as a destination IP address and forwards this to home access router 820. The home access router 820 receives the packet and forwards it to home agent 840, which in turn forwards the packet to mobile device 812 through home access router 822.

Other implementations are also contemplated.

What is claimed is:

1. A method for performing route optimization based on network enforced, and mobile implemented, policy, the method comprising:
   establishing, from a mobile device, a communication session with an access router;
   receiving, via the established communication session, a first IP address and a second IP address to be assigned to the mobile device;
   receiving, at the mobile device and from a mobile communication network server, a set of rules specifying a manner in which the first IP address and the second IP address are to be used;
   evaluating, at the mobile device, at least one parameter of the communication session against the set of rules to determine to communicate with an external device using a selected one of the first IP address and the second IP address; and
   communicating with the external device using the selected IP address as the address of the mobile device based upon a result of the evaluation, wherein:
   establishing the communication session with the access router includes establishing a communication session with a roaming access router located outside a home network with which the mobile device is registered and the roaming access router is connected to a roaming home agent belonging to a visited network that is outside the home network and a home agent belongs to the home network,
   receiving the first IP address includes receiving a roaming IP address configured to enable the mobile device to communicate with the external device through the visited network, and
   receiving the second IP address includes receiving a home IP address configured to enable the mobile device to communicate with the external device through the home network.

2. The method of claim 1, wherein:
   evaluating the at least one parameter of the communication session against the set of routes includes evaluating at least one parameter of the communication session against the set of rules to determine that the external device is in the visited network, and communicating with the external device includes communicating with the external device using the roaming IP address and avoiding sending traffic to the home network.

3. The method of claim 1, wherein:
   evaluating the at least one parameter of the communication session against the set of rules includes evaluating at least one parameter of the communication session against the set of rules to determine that the external device is in the home network, and communicating with the external device includes communicating with the external device using the home IP address.

4. The method of claim 1, wherein:
   evaluating the at least one parameter of the communication session against the set of rules includes evaluating at least one parameter of the communication session against the set of rules to determine a location of the mobile device and determine that the mobile device is in the visited network based on the location of the mobile device, and communicating with the external device includes communicating with the external device using the roaming IP address.

5. The method of claim 1, wherein receiving the roaming IP address includes receiving the roaming IP address from a visited network policy server or a roaming home agent.

6. The method of claim 1, wherein receiving the home IP address includes receiving the home IP address from a home policy server or a home agent.

7. The method of claim 1, wherein receiving the set of rules includes receiving the set of rules from a home policy network server that belongs to the home network.

8. The method of claim 7, wherein receiving the set of rules includes receiving a set of rules directing the mobile device to use the roaming IP address as a source IP address for outgoing traffic associated with applications requiring high priority.

9. The method of claim 7, wherein receiving the set of rules includes receiving a set of rules directing the mobile device to use the roaming IP address as a source IP address for outgoing traffic requiring a specific type of quality of service treatment.

10. The method of claim 1, wherein:
    evaluating the at least one parameter of the communication session against the set of rules includes evaluating a type of application associated with the communication session against the set of rules, and
    communicating with the external device includes communicating with the external device using either the roaming IP address or the home IP address based on the type of application associated with the communication session.

11. The method of claim 1, wherein:
    evaluating the at least one parameter of the communication session against the set of rules includes evaluating a type of quality of service associated with the communication session against the set of rules, and
    communicating with the external device includes communicating with the external device using either the roaming IP address or the home IP address based on the type of quality of service associated with the communication session.

12. A mobile device, configured to:
    establish, from a mobile device, a communication session with a roaming access router located outside a home network with which the mobile device is to be registered, the roaming access router being connected to a roaming home agent belonging to a visited network that is outside the home network, and a home agent belonging to the home network;
    receive, via the established communication session, a roaming IP address, as a first IP address, configured to enable the mobile device to communicate with the external device through the visited network; and
    receive, via the established communication session, a home IP address, as a second IP address to be assigned to the mobile device, configured to enable the mobile device to communicate with the external device through the home network;
    receive, from a mobile communication network server, a set of rules specifying a manner in which the first IP address and the second IP address are to be used;
    evaluating, at the mobile device, at least one parameter of the communication session against the set of rules to determine to communicate with an external device using a selected one of the first IP address and the second IP address; and
    communicate with the external device using the selected IP address as the address of the mobile device based upon a result of the evaluation.

13. A router, configured to:
    establish, by an initiation from a mobile device, a communication session with a roaming access router and the mobile device, the roaming access router being located outside a home network with which the mobile device is registered and connected to a roaming home agent belonging to a visited network that is outside the home network, a home agent belonging to the home network;

provide, via the established communication session, the mobile device with a roaming IP address, as a first IP address, configured to enable the mobile device to communicate with the external device through the visited network; and provide, via the established communication session, the mobile device with a home IP address, as a second IP address to be assigned to the mobile device, configured to enable the mobile device to communicate with the external device through the home network;

provide the first mobile device with a set of rules specifying a manner in which the first IP address and the second IP address are to be used; and establish a communication between the mobile device and a second device using a selected IP address as the address of the mobile device selected based upon a result of the mobile device evaluating at least one parameter of the communication session against the set of rules to determine to communicate with the second device using a selected one of the first IP address and the second IP address.

* * * * *